United States Patent [19]
Shimizu

[11] 3,945,471
[45] Mar. 23, 1976

[54] DISC BRAKE PAD WEAR INDICATOR STRUCTURE

[75] Inventor: Kazuaki Shimizu, Yokosuka, Japan

[73] Assignee: Nissan Motor Company Limited, Yokohama, Japan

[22] Filed: Aug. 27, 1974

[21] Appl. No.: 501,085

[30] Foreign Application Priority Data
Aug. 28, 1973  Japan.................. 48-100148[U]

[52] U.S. Cl................. 188/1 A; 188/72.5; 188/73.4
[51] Int. Cl.² ........................................ F16D 66/02
[58] Field of Search ........ 188/1 A, 71.1, 72.3, 72.5, 188/73.4, 216

[56] References Cited
UNITED STATES PATENTS

| | | | |
|---|---|---|---|
| 3,497,036 | 2/1970 | Seip | 188/1 A X |
| 3,661,232 | 5/1972 | Kondo | 188/73.4 |
| 3,692,151 | 9/1972 | Kobayaski et al. | 188/73.4 X |
| 3,712,422 | 1/1973 | Haraikawa | 188/72.3 |
| 3,716,113 | 2/1973 | Kobayashi et al. | 188/1 A |

*Primary Examiner*—George E. A. Halvosa

[57] ABSTRACT

Elastic members are disposed between yoke and the torque absorbing structure of a spot-type disc brake, the elastic members reacting against the yoke under actuated conditions only when an indirectly actuated friction pad is worn to such an extent that the yoke travels towards the face of a brake disc in excess of preselected distance, thereby to abruptly make the stroke of a brake pedal large so as to give a warning of danger to a driver that the friction pad is worn to a dangerous extent.

8 Claims, 7 Drawing Figures

DISC BRAKE PAD WEAR INDICATOR STRUCTURE

This invention relates to a disc brake for a vehicle, and more particularly to a disc brake having a single hydraulic cylinder which actuates two friction pad assemblies.

Conventional disc brake usually include a stationary hydraulic cylinder in which two opposed pistons are axially slidably disposed, and a pair of friction pad assemblies, one of which is disposed between the hydraulic cylinder and the adjacent face of a brake disc, and the other being positioned adjacent to the opposite face of the brake disc. The two pistons are respectively associated with the two friction pad assemblies in such a manner that one piston is in abutting engagement with one friction pad assembly to directly move the assembly toward the brake disc, and the other piston engages with a movable member such as a yoke by which the indirectly actuated friction pad assembly is moved toward the brake disc. The stationary hydraulic cylinder is usually integrally formed with a torque absorbing structure which has a pair of legs straddling the brake disc and extending in parallel to the face thereof for guiding the directly and indirectly actuated friction pad assemblies therebetween.

With the above-mentioned disc brake arrangement, it has been feared that the legs of the torque absorbing structure would prevent the yoke from travelling toward the face of the disc, so that sufficient pressure of the friction pad against the face of the disc could not be achieved despite the proper effort applied to the brake pedal.

To avoid the above risk, certain attempts hitherto have been made as will be described below. That is, first, there was provided a considerably large clearance between the yoke and each of the legs of the torque absorbing structure by cutting away peripheral portions of the yoke which otherwise would block the yoke travelling toward the face of the disc. The clearance is decided in such a manner as to be large enough to avoid the unwanted contact of the yoke with the legs of the torque absorbing structure in consideration of errors in size during manufacturing. Therefore, the yoke could freely advance in response to the driver's braking, so that the indirectly actuated friction pad is forced against the face of the brake disc without failure. The second attempt was to reduce the size of the legs of the torque absorbing structure in order to obtain the same performance as in the first case. However, none of these have proven satisfactory: the clearance of the former adversely affects the structural strength of the yoke, and in the latter case the reduction of the legs makes it difficult to hold the friction pad assembly firmly therebetween and also reduces the structural strength of the torque absorbing structure which must be sufficient to withstand the bending and torsional moments applied thereto during braking.

According to the present invention, an elastic means such as a plate spring is attached to a suitable support member which is rigidly fixed to the yoke. The elastic means is provided so as to react against the yoke when the yoke travels toward the face of the brake disc in excess of a preselected distance. Therefore, if the friction pad is worn beyond a predetermined length, the travel of the brake pedal becomes relatively large due to the reaction of the elastic means against the yoke, so that the driver acknowledges the dangerously excessive wear. As a result, in order to avoid the disadvantages of the prior art, it is necessary not to provide the aforesaid large clearance between the yoke and the leg portions of the torque absorbing structure or to reduce the leg size. The improvement is also carried out by provision of the elastic means between the yoke and each of the legs of the torque absorbing structure as will be described in detail in connection with the accompanying drawings.

It is, therefore, an object of the present invention to provide an improved disc brake which overcomes the shortcomings mentioned hereinabove.

Another object of the present invention is to provide an improved disc brake for use in a vehicle in which an elastic means is mounted on the yoke by a suitable support member so as to react against the yoke when the yoke travels toward the face of the brake disc in excess of a preselected distance.

Still another object of the present invention is to provide an improved disc brake for use in a vehicle in which an elastic means is disposed between the yoke and the legs of the torque absorbing structure so as to react against the yoke when the yoke travels toward the face of the brake disc in excess of a preselected distance.

These and other object and advantages of the present invention will become more apparent from the following description when taken in conjunction with the accompanying drawings, wherein like parts in each of the several figures are identified by the same reference characters, and wherein.

Figure 1:
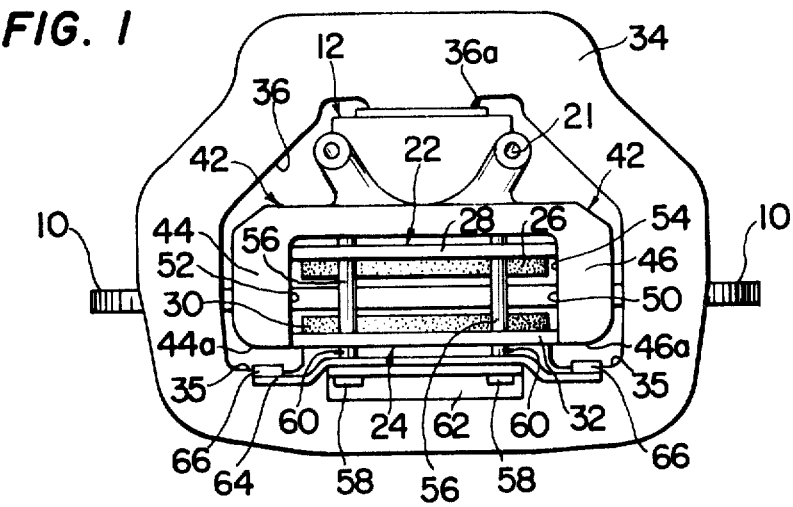
FIG. 1 is a top plan view of one preferred embodiment of a disc brake according to the present invention.
Figure 2:
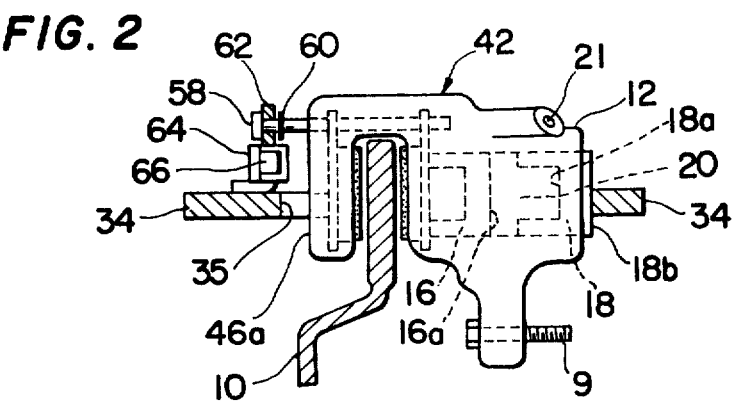
FIG. 2 is a side view partially in section of the embodiment of FIG. 1.

Referring now to FIGS. 1 to 2, there is shown a preferred embodiment according to the present invention. As shown, the disc brake includes a rotatable disc 10 which is mounted for rotation with a wheel (not shown) of the motor vehicle. Adjacent to a face of the brake disc 10 is disposed a stationary hydraulic cylinder 12 which is rigidly fixed to a frame or other structural part of the motor vehicle through suitable fastening means denoted by numeral 9. The stationary hydraulic cylinder 12 is open at both ends and disposed so its axis is substantially parallel to the axis of the disc 10. The pistons 16 and 18 have inner walls 16a and 18a, respectively, and define a fluid chamber 20 therebetween. The fluid chamber 20 communicates through a bore 21 with a master cylinder (not shown) so that fluid under pressure is supplied thereinto when a brake pedal is depressed, whereby the pistons 16 and 18 are urged apart.

Directly and indirectly actuated friction pad assemblies 22 and 24 are positioned adjacent to the faces of the disc 10. The directly actuated friction pad assembly 22 is interposed between the brake disc 10 and the inner piston 16, and comprises a friction pad 26 and a backing plate 28 to which the friction pad 26 is bonded on or otherwise secured. The inner piston 16 is thus in abutting engagement with the inner face of the braking plate 28. The indirectly actuated friction pad assembly 24 is positioned adjacent to the corresponding opposite side of the disc 10 and comprises a friction pad 30 and a backing plate 32 secured thereto. The backing plates 28 and 32 may preferably have larger areas than the respective friction pads 26 and 30.

The stationary hydraulic cylinder 12 and the friction pad assemblies 22 and 24 are surrounded by a yoke 34 which is in the form of a flat plate. The yoke 34 has a suitably shaped opening 36 which accommodates an arc of the disc 10 and which had a projection 36a which bears against an outer wall 18b of the outer piston 18.

In FIG. 1, the stationary hydraulic cylinder 12 is shown to have a torque absorbing carrier 42 which comprises a pair of leg portions 44 and 46 which are integrally formed with the stationary hydraulic cylinder 12 and extend parallel to the axis of the disc 10 and then further extend parallel to the face of disc 10 to form leg portions 44a and 46a (in FIG. 2, the former is not shown because it is just behind the leg portion 46a).

As shown in FIGS. 1 and 2, the torque absorbing structure 42 is provided with an opening 50 which is defined by the leg portions 44, 44a, 46, 46a, and which receives therein the directly and indirectly actuated friction pad assemblies 22 and 24. This opening 50 provides easy access to the friction pad assemblies 22 and 24, facilitating inspection and replacement thereof. Provision of such an opening will also prove advantageous in dissipating fractional heat produced by the disc 10 and friction pads 26 and 30.

The opening 50 has two opposite edges 52 and 54 for abutting engagement with the ends of the directly and indirectly actuated friction pad assemblies 22 and 24, so that the friction pad assemblies 22 and 24 are guided thereby toward and away from the disc 10. Also, the brake torque exerted on the friction pad assemblies 22 and 24 is transferred through the leg portions 44, 44a, 46 and 46a to the stationary hydraulic cylinder 12 and the vehicle frame.

A pair of guide pins 56 are supported by a bracket 62 rigidly fixed to the yoke 34 and pass through holes (not shown) formed through the friction pad assemblies 22 and 24, and each pin 56 has one end fitted into a blind bore (no numeral) formed in the cylinder 12. Each pin 56 has a head 58 and a clip 60 to prevent movement thereof.

In accordance with an improved feature of the present invention, the bracket 62 is provided with a plate spring 64 rigidly fixed thereto. Disposed on opposite ends of the plate spring 64 is a pair of spacers 66 in facing relationship with the respective leg portions 44a and 46a. The positioning of the spacers 66 and the plate spring 64 is such that the spacers 66 commence to press the respective leg portions 44a and 46a when the friction pad 30 is worn in excess of a preselected length, that is, when the yoke travels toward the face of the disc 10 beyond the predetermined distance. The distance is determined with respect to the thickness of the friction pads 28 and 30 and the clearance between edges 35 of the yoke 34 and the leg portions 44a or 46a, etc. It is understood from the drawings that the edges 35 never prevent travel of the yoke before the spacers 66 press the leg portions 44a and 46a. When the spacers 66 press against the leg portions 44a and 46a, the plate spring 64 reacts against the yoke 34 in the reverse direction. The reaction in turn causes the piston 18 to move toward the face of the disc 10 when a driver takes his foot off the brake pedal, thereby the travel of the brake pedal is increased compared to that in the absence of the plate spring 64. The increased travel of the brake pedal causes the driver to become aware of at least excessive wear of the friction pad 30. Therefore, the driver can avoid the danger of brake failure due to the blocking of the yoke 34 by the leg portions 44a and 46a. It should be appreciated that the present embodiment makes it unnecessary to cut away the peripheral portions of the yoke or at least minimizes the cutaway portions, and furthermore makes it unnecessary to shorten the leg portions 44a and 46a. As a result, the disadvantages described in connection with the prior art are completely overcome.

Figure 3:
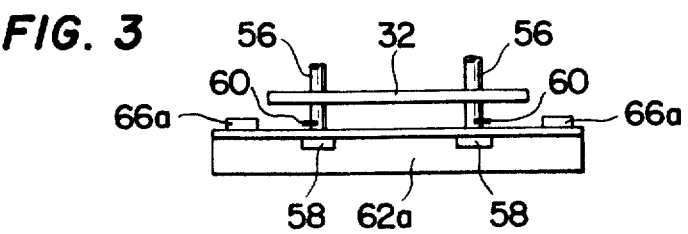
FIG. 3 is a partial top plan view showing a modification of the embodiment of FIG. 1.

In FIG. 3, there is shown a modification of the embodiment of FIGS. 1 and 2, in which the spring plate 64 id omitted and elastic members 66a replace the spacers 66.

The elastic members 66a are fixed to the opposite ends of the elongated bracket 62a by suitable means in such a manner as to face the leg portions 44a and 46a respectively. Further description as to the operation of the elastic members 66a will be unnecessary since it is the same as in FIGS. 1 and 2.

Figure 4:
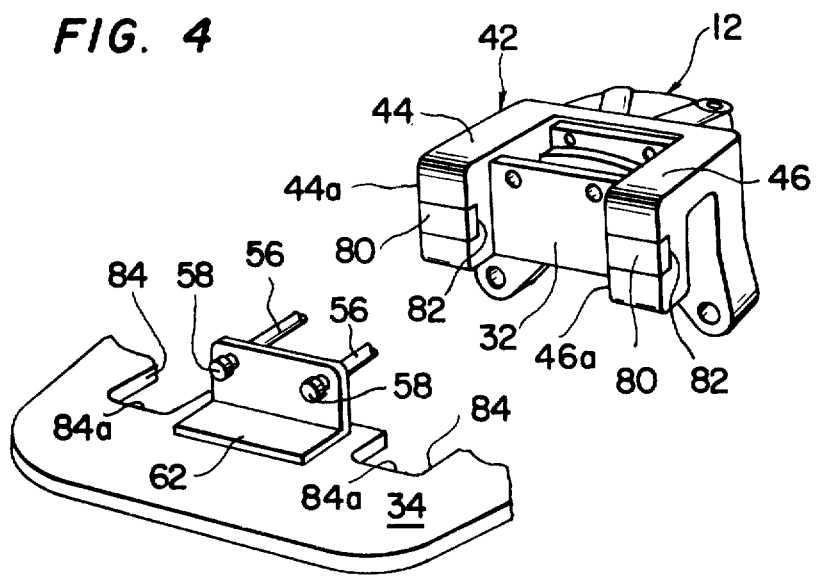
FIG. 4 is a perspective view of another preferred embodiment of a disc brake according to the present invention.
Figure 5:
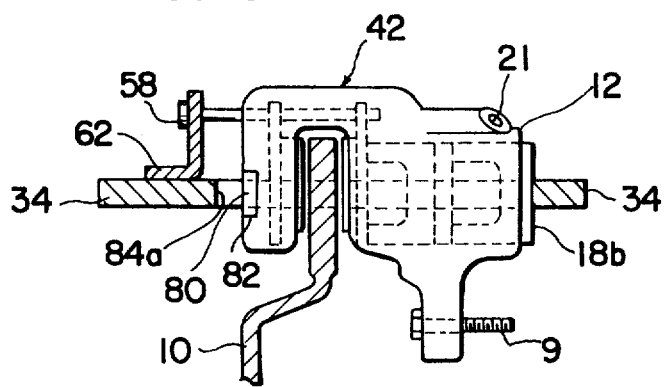
FIG. 5 is a side view of the embodiment of FIG. 4.

In FIGS. 4 and 5, there is illustrated another preferred embodiment of a disc brake according to the present invention, wherein a pair of elastic members 80 are snugly fitted within and fixed rigidly by suitable means to their associated rectangular hollows 82 which are formed in the surface the leg portions 44a and 46a respectively of the torque absorbing structure 42 as shown. The pair of hollows 82 are arranged in such a manner as to face their respectively associated hollows or recesses 84 which are provided in the inner peripheral portions of the yoke 34. The depth of the hollows 84 is such that when the friction pad 30 is worn in excess of a preselected length, the pair of edges 84a commence to press the elastic members 80. Therefore, the elastic members 80 generate reactive forces against the edges 84a, or in other words, the yoke 34. The reaction in turn causes the travel of the brake pedal (not shown) to increase as described in detail in connection with the FIGS. 1 and 2 embodiment according to the present invention. Thus, a driver will be able to acknowledge wear and impending brake failure due to insufficent pressure of the friction pad 30 against the face of the disc 10, which would result from the blocking of the advancing yoke by the leg portions 44a and 46a. The embodiment of FIGS. 4 and 5 also can make it unnecessary to cut away the peripheral portions of the yoke or at least minimize the cutaway portions, and furthermore make it unnecessary to shorten the leg portions 44a and 46a.

Figure 6:
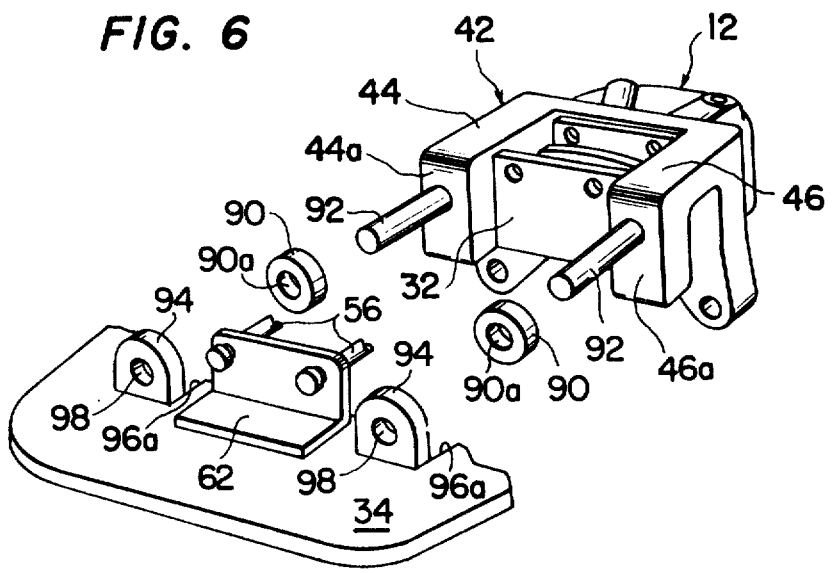
FIG. 6 is a perspective view of still another preferred embodiment of a disc brake according to the present invention.
Figure 7:
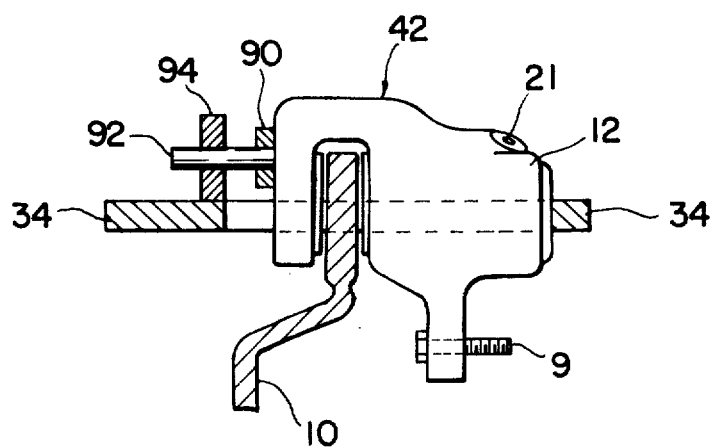
FIG. 7 is a side view of the embodiment of FIG. 6.

Reference is now made to FIGS. 6 and 7, wherein there is illustrated still another embodiment of a disc brake in accordance with the present invention. In the present embodiment, provided are a pair of ring-shaped elastic members 90 which are carried by associated rods 92 at their openings 90a. The rods 92 protrude substantially perpendicularly to the face of the disc 10 from the leg portions 44a and 46a respectively. The yoke 34 is provided with a pair of surfaces 94 each of which is substantially parallel to the face of the disc 10 and has an opening 98 snugly slidably receiving each of the rods 92 for supporting them. As seen from FIG. 7, the elastic ring-shaped members 90 are disposed between the surfaces 94 and the leg portions 44a and 46a. The thickness of the elastic member 90 is determined in consideration of the clearance between the edge 94 and the leg portion 44a or 46a, and also the thickness of the friction pads 28 and 30, etc. With this arrangement, when the friction pad 30 is worn in excess of a preselected length, the surfaces 94 start to force the elastic ring-shaped members 90 against the respective leg portions 44a and 46a. The phenomenon of the pressure in turn increases the travel of the brake pedal (not shown) as previously described. In the above, the elastic ring-shaped members can be replaced by elastic sphere or torus members with an opening for receiving the rods 92.

What is claimed is:

1. A disc brake for a wheeled vehicle, having a rotatable brake disc, a stationary hydraulic cylinder having inner and outer pistons slidable in opposite directions which are substantially parallel to the axis of said brake disc, said pistons defining a fluid chamber therebetween into which pressurized fluid is suppliable to initiate braking, directly and indirectly actuated friction pad assemblies positioned adjacent to the opposed faces of said brake disc, said directly actuated friction pad assembly being in abutting engagement with said inner piston and thereby forced against said brake disc when said inner piston is moved by said pressurized fluid, a yoke movable in a direction parallel to said axis of said brake disc by said outer piston to move said indirectly actuated friction pad assembly, and a torque absorbing structure integrally formed with said stationary hydraulic cylinder and having a pair of legs straddling said brake disc for guiding said directly and indirectly actuated friction pad assemblies, characterized by elastic means being mounted on said yoke and normally spaced from said torque absorbing structure, said elastic means reacting against said yoke under actuated conditions only when said indirectly actuated friction pad is worn to such an extent that said yoke travels towards the face of said brake disc in excess of a preselected distance and at least a portion of said elastic means comes into contact with said torque absorbing structure.

2. A disc brake claimed in claim 1, wherein said elastic means is a plate spring disposed generally transversely to the longitudinal axis of each of said pair of legs and wherein each of said legs has an end face facing an associated end portion of said spring.

3. A disc brake claimed in claim 2, wherein said plate spring has a pair of spacers attached to respective opposite ends thereof in facing relationship with said end faces of said pair of legs, respectively.

4. A disc brake claimed in claim 1, wherein said elastic means is a pair of elastic pieces attached to the opposite ends of a bracket mounted on said yoke such that said pair of elastic pieces face respectively associated end faces on said pair of legs.

5. A disc brake for a wheeled vehicle, having a rotatable brake disc, a stationary hydraulic cylinder having inner and outer pistons slidable in opposite directions which are substantially parallel to the axis of said brake disc, said pistons defining a fluid chamber therebetween into which pressurized fluid is supplied when a braking action is initiated, directly and indirectly actuated friction pad assemblies positioned adjacent to opposite faces of said brake disc, said directly actuated friction pad assembly being in abutting engagement with said inner piston and thereby forced against said brake disc when said inner piston is moved by said pressurized fluid, a yoke movable in a direction parallel to said axis of said brake disc by said outer piston to move said indirectly actuated friction pad assembly, and a torque absorbing structure integrally formed with said stationary hydraulic cylinder and having a pair of legs straddling said brake disc for guiding said directly and indirectly actuated friction pad assemblies, characterized by elastic means disposed between said yoke and said pair of legs of said torque absorbing structure, said elastic means reacting against said yoke under actuated conditions only when said indirectly actuated friction pad is worn to such an extent that said yoke travel towards the face of said brake disc in excess of a preselected distance.

6. A disc brake claimed in claim 5, wherein said elastic means is a pair of elastic members fixedly attached to said pair of legs, respectively and in facing relationship with associated spaced apart portions on said yoke.

7. A disc brake claimed in claim 6, wherein said pair of elastic members each is snugly fitted within a hollow formed in the surface of each of said pair of legs.

8. A disc brake claimed in claim 5, wherein said elastic means is a pair of elastic members each having an opening therethrough, said pair of elastic members each carried at said opening by a rod which extends substantially perpendicularly to the face of said disc from each of said pair of legs, and each of said rods is slidably received in holding means mounted on said yoke in facing relationship, respectively, with said pair of legs.

* * * * *